United States Patent [19]
Kondo et al.

[11] Patent Number: 5,850,261
[45] Date of Patent: *Dec. 15, 1998

[54] EFFICIENT VARIABLE LENGTH ENCODER AND DECODER

[75] Inventors: Tetsujiro Kondo, Kanagawa; Kenji Takahashi, Tokyo, both of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 767,830

[22] Filed: Dec. 17, 1996

Related U.S. Application Data

[63] Continuation of Ser. No. 244,856, filed as PCT/JP93/01470 Oct. 13, 1993 published as WO94/09594 Apr. 28, 1994, abandoned.

[30] Foreign Application Priority Data

Oct. 15, 1992 [JP] Japan .................................. 4-277384

[51] Int. Cl.$^6$ .................................................. H04N 7/24
[52] U.S. Cl. ................... 348/420; 348/845.1; 348/845.2
[58] Field of Search ...................... 348/384, 390, 348/405, 409, 420, 421, 845, 845.1, 845.2; 386/1, 109, 112; 360/32; H04N 7/130, 5/76, 5/92

[56] References Cited

U.S. PATENT DOCUMENTS

| | | | |
|---|---|---|---|
| 4,454,546 | 6/1984 | Mori . | |
| 4,722,003 | 1/1988 | Kondo | 348/421 |
| 4,890,161 | 12/1989 | Kondo | 348/421 |
| 4,947,249 | 8/1990 | Kondo | 348/421 |
| 4,953,023 | 8/1990 | Kondo | 348/409 |
| 5,023,710 | 6/1991 | Kondo et al. | 348/421 |
| 5,049,990 | 9/1991 | Kondo et al. | 348/421 |
| 5,068,726 | 11/1991 | Kondo et al. | 348/421 |
| 5,193,003 | 3/1993 | Kondo | 348/420 |
| 5,196,931 | 3/1993 | Kondo | 348/420 |
| 5,241,381 | 8/1993 | Kondo | 348/421 |
| 5,253,122 | 10/1993 | Chiba et al. | 358/335 |

FOREIGN PATENT DOCUMENTS

| | | |
|---|---|---|
| 0 339 589 | 11/1989 | European Pat. Off. . |
| 0 373 924 | 6/1990 | European Pat. Off. . |
| 31 09 795 | 12/1981 | Germany . |
| 1-162080 | 6/1989 | Japan . |

OTHER PUBLICATIONS

Matsumoto, Shuichi, "Trend of TV Digital Coding Technology", *Broadcast Engineering* May 1992 (Tokyo), pp. 70–89, (No Translation).

IEEE International Conference on Communications ICC '90, vol. 3, Apr. 1990, Atlanta, GA, US pp. 1035–1042, XP000145988 Takahashi et al 'Robustness of Data Compression Coding Schemes For Still Pictures Over Noisy Channels'.

Patent Abstracts of Japan, vol. 16, No. 221 (E–1205) 22 May 1992, JP–A–04 037 367 (Fujitsu General Limited) 7 Feb. 1992.

*Primary Examiner*—Richard Lee
*Attorney, Agent, or Firm*—Frommer Lawrence & Haug, LLP; William S. Frommer

[57] ABSTRACT

There are provided an encoding circuit 2 which encodes pixel data by an ADRC method; a dividing circuit 3 which divides the data from the encoding circuit 2 into a plurality of bit planes; an encoding circuit 4 which encodes, with run length coding and Huffman coding, the data at every bit plane of the plurality of bit planes divided and generated by the dividing circuit; and a framing circuit 5 which adds an error correcting code to the encoded pixel data. The data encoded by the ADRC method are divided into the bit plane for each of MSB, 2nd MSB, . . . LSB and the respective bit planes are processed by the run length coding and Huffman coding, so that it is possible to compress the data with a high compressibility and at the same time minimize the lowering of the restoration capability of the data when an error is generated.

16 Claims, 7 Drawing Sheets

| 4 | 7 | 1 |
|---|---|---|
| 3 | 6 | 1 |
| 2 | 5 | 0 |

FIG. 4B

| / | 7 | 6 | 5 | 4 | 3 | 2 | 1 | 0 |
|---|---|---|---|---|---|---|---|---|
| MSB | 1 | 1 | 1 | 1 | 0 | 0 | 0 | 0 |
| 2nd | 1 | 1 | 0 | 0 | 1 | 1 | 0 | 0 |
| LSB | 1 | 0 | 1 | 0 | 1 | 0 | 1 | 0 |

FIG. 4C

| 0 | 0 | 0 |
|---|---|---|
| 0 | 1 | 0 |
| 1 | 1 | 0 |

FIG. 4D

| 1 | 0 | 0 |
|---|---|---|
| 1 | 1 | 0 |
| 0 | 1 | 0 |

FIG. 4E

| 0 | 1 | 0 |
|---|---|---|
| 1 | 0 | 1 |
| 0 | 1 | 1 |

EFFICIENT VARIABLE LENGTH ENCODER AND DECODER

This application is a continuation of application Ser. No. 08/244,856, filed as PCT/JP93/01470 Oct. 13, 1993 published as WO94/09594 Apr. 28, 1994 now abandoned.

TECHNICAL FIELD

The present invention relates to an encoder and a decoder which are, for example, suitable to a CODEC or the like for encoding and compressing information and for decoding compressed information to original information.

BACKGROUND ART

Heretofore, an apparatus called "CODEC" has been proposed. The CODEC is an apparatus for encoding and compressing image data at the time of transmission or recording of image data. The encoding of image data has been standardized on the basis of video CODEC (coder and encoder) recommendation H.261 which was concluded by International Telegraph and Telephone Consultative Committee (CCITT) under the control of International Telecommunication Union (ITU) in December 1990. Dynamic image encoding is used, for example, in the fields of broadcasting, communication, and so on, for the purpose of transmitting a signal to a remote place with a standard television or a high definition (HD) television used as a signal source and, for example, in the fields of storage, and so on, for the purpose of local signal processing. As a video format based on the recommendation H.261, there is a common intermediate format (CIF) by which regional differences in television system (in the whole world) are exemplified to make communications between CODECs possible.

The resolution of an image based on the CIF is 352 dots in horizontal direction and 288 dots in vertical direction.

An encoding portion of a video CODEC generally encodes input video data through an encoder, multiplex-encodes the data and once stores the data in a transmission buffer. Then, the encoding portion encodes the stored data through a transmission encoder and transmits the data as an encoded bit string. A decoding portion thereof decodes the transmitted and encoded bit string video data through a transmission decoder and once stores the data in a reception buffer. Then, the decoding portion multiplex-decodes the data and decodes the data to obtain an original video signal. In the case of transmission of such a large quantity of image data, the image data is encoded and compressed at the time of transmission thereof, and the encoded and compressed image data is decoded at the time of reception thereof. Accordingly, the video CODEC can be used not only at the time of transmission of an image but at the time of recording of image data, for example, in a VTR. Particularly, image data of a high definition television type which has been rapidly advanced recently requires a large quantity of data different from the image data of a standard television type. A subject essential to remarkable reduction in recording cost is therefore to encode and compress data at the time of recording and decode the data to obtain original image data at the time of reproduction.

As one of television signal processing methods in the CODEC, there are known some methods by which the average number of bits per pixel or sampling frequency is reduced in order to narrow the transmission band. As an encoding method for reducing the sampling frequency, there has been proposed a method in which: image data are thinned to half by sub-sampling; and sub-sampling points and a flag for indicating the position of a sub-sampling point used at the time of interpolation are transmitted. That is, the flag indicating what sampling point data is selected from sampling pints in the upper and lower positions or left and right positions of an interpolation point, is transmitted. As an encoding method for reducing the average number of bits per pixel, there is known a DPCM (differential PCM). In the DPCM, a signal of difference between adjacent pixels is quantized and transmitted on the basis of the fact that the correlation between pixels in a television signal is high and that the difference between pixels in the vicinity is small. As another encoding method for reducing the average number of bits per pixel, there is a method in which a one-field screen is subdivided into fine blocks so that an average value and a standard deviation at every block and a one-bit encoded code for every pixel are transmitted. In the encoding method to reduce sampling frequency by using sub-sampling, there is a risk that aliasing distortion may occur because sampling frequency is reduced to half. The DPCM has a problem that errors propagate to decoding after errors are generated. In the method for performing encoding at a block unit, there arises a disadvantage that block distortion occurs in the boundary between blocks.

Figure 6A:
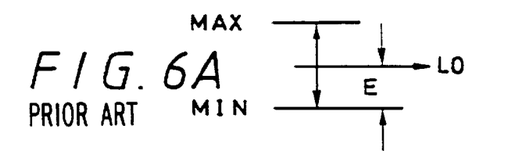
FIG. 6A is an explanatory view showing the case where the dynamic range used for explaining ADRC processing is "8"

Therefore, the applicant of the present invention has proposed a high-efficient coding apparatus in which a dynamic range determined on the basis of the maximum and minimum values of a plurality of pixels contained in a two-dimensional block is calculated so that encoding is performed in a variable bit length corresponding to the dynamic range (see Japanese Patent Laid-Open Publication No. 61-144989). FIG. 6 is used for explaining the variable bit length coding suitable to the dynamic range previously proposed, that is, for explaining an adaptive dynamic range coding (ADRC). For example, the dynamic range is calculated at every two-dimensional block composed of (4 lines×4 pixels=16 pixels). The minimum level (minimum value) in the block is removed from input pixel data having 8 bits as one sample. Pixel data after removal of the minimum value is quantized. The quantization is a process for converting the pixel data after removal of the minimum value into a representative level data. The maximum permissible value to quantizing distortion generated at the time of the quantization (hereinafter referred to as "maximum distortion") is set to a predetermined value, for example, 4. FIG. 6A shows the case where the dynamic range (the difference between the maximum value MAX and the minimum value MIN) is 8. In the case of (DR=8), the level 4 at the center is selected as the representative level L0, and (maximum distortion E=4) holds. That is, in the case of (0≦DR≦8), the center level of the dynamic range is selected as the representative level, so that there is no necessity of transmitting quantized data. Accordingly, the required bit length Nb is 0. In the reception side, such a decoding is performed that the representative level L0 is used as a restoration or reconstructed value on the basis of the minimum value MIN and dynamic range of the block.

Figure 6B:
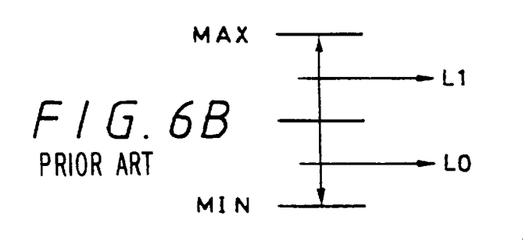
FIG. 6B is an explanatory view showing the case where the dynamic range used for explaining ADRC processing is "17"

FIG. 6B shows the case of (DR=17). In this case, representative levels (L0=4) and (L1=13) are determined respectively, so that the maximum distortion E is 4. Because there are two representative levels L0 and L1, the (Nb=1) is selected. In the case of (9≦DR≦17), the (Nb=1) is selected. The maximum distortion E decreases as the dynamic range is narrowed.

Figure 6C:
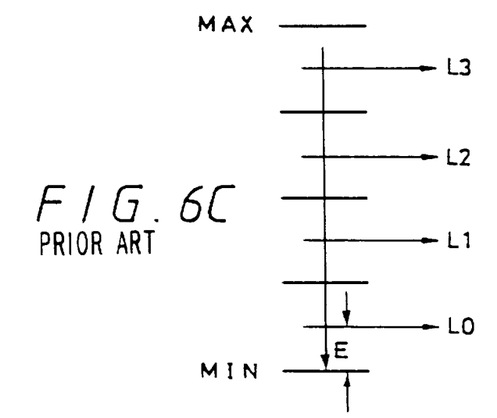
FIG. 6C is an explanatory view showing the case where the dynamic range used for explaining ADRC processing is "35"
Figure 6D:
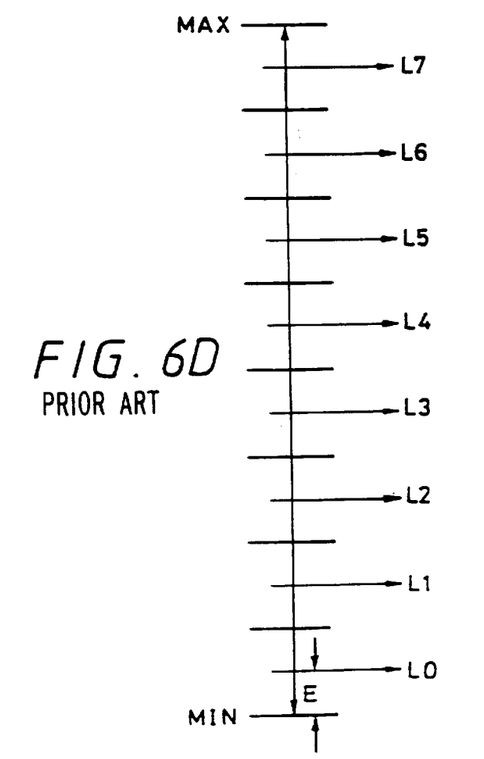
FIG. 6D is an explanatory view showing the case where the dynamic range used for explaining ADRC processing is "71"
Figure 6E:
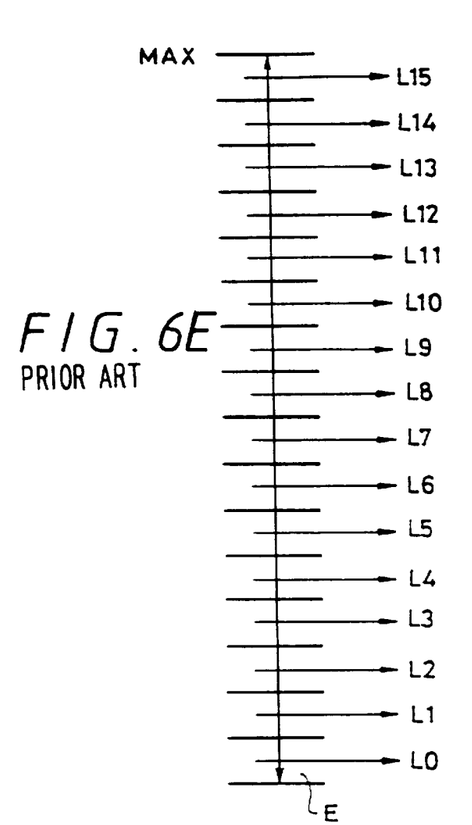
FIG. 6E is an explanatory view showing the case where the dynamic range used for explaining ADRC processing is "143"
Figure 6F:
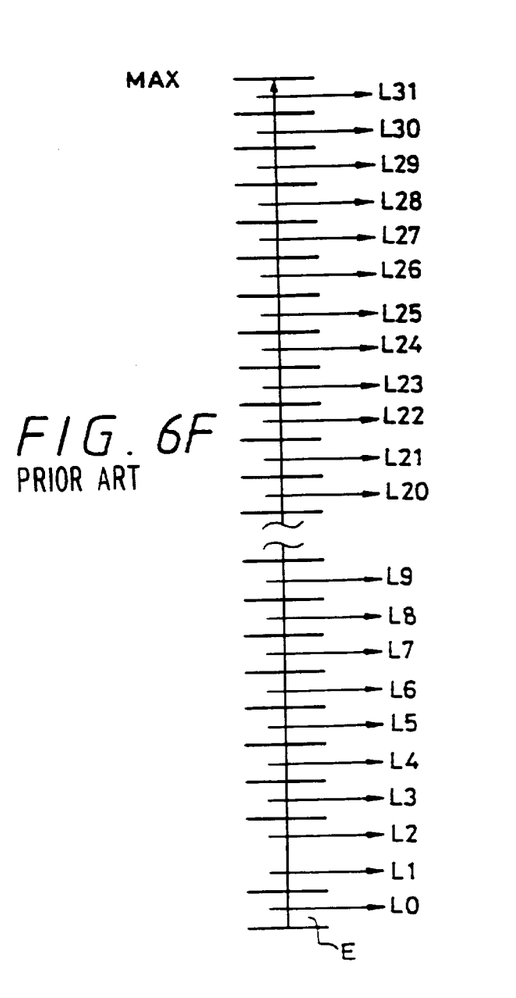
FIG. 6F is an explanatory view showing the case where the dynamic range used for explaining ADRC processing is "287".

FIG. 6C shows the case of (DR=35). In this case, representative levels (L0=4), (L1=13), (L2=22) and (L3=31) are determined respectively, so that the (E=4) is established. Because there are four representative levels L0 to L3, the (Nb=2) is selected. In the case of (18≦DR≦35), the (Nb=2) is selected. In the case of (36≦DR≦71), eight representative levels (L0 to L7) are used. FIG. 6D shows the case of (DR=71). In this case, representative levels (L0=4), (L1=13), (L2=22), (L3=31), (L4=40), (L5=49), (L6=58) and (L7=67) are determined respectively. For discrimination among the eight representative levels L0 to K7, the (Nb=3) is selected. In the case of (72≦DR≦143), sixteen representative levels (L0 to L15) are used. FIG. GE shows the case of (DR=143). In this case, representative levels are set to (L8=76), (L9=85), (L10=94), (L11=103), (L12=112), (L13=121), (L14=130) and (L15=139) (in addition to the representative levels L0 to L7 which are set to values as explained above). For discrimination among the sixteen representative levels (L0 to L15), the (Nb=4) is selected. In the case of (144≦DR≦287), 32 representative levels (L0 to L31) are used. FIG. 6F shows the case of (DR=287). In this case, representative levels are set to (L16=148), (L17=157), (L18=166), (L19=175), . . . (L27=247), (L28=256), (L29=265), (L30=274) and (L31=283) (in addition to the representative levels L0 to L15 which are set to values as explained above). For discrimination among the 32 representative levels (L0 to L31), the (Nb=5) is selected. Because, in practice, input pixel data are quantized by 8 bits, the maximum value of the dynamic range is 255. Accordingly, the input pixel data are not quantized to the representative levels (L28 to L31).

Because television signals in one block have a three-dimensional correlation with respect to the two dimensions of horizontal and vertical directions and the dimension of a time direction, the width of the level change of pixel data contained in one and the same block is small in a stationary portion. Accordingly, even in the case where the dynamic range of data DT1 after removal of the minimum level MIN common to pixel data in one block is quantized by a smaller number of quantization bits than the original number of quantization bits, almost no quantizing distortion occurs. By reducing the number of quantization bits, the width of the data transmission band can be set to be smaller than the original width.

By the way, in a coding apparatus applied to a dynamic range in the case of the above variable bit length, the maximum permissible distortion E is determined, for example, to 4. If the value of the maximum distortion E is selected to be larger, the bit length Nb can be reduced further so that the compressibility can be heightened. However, if the maximum distortion E is selected to be larger, block distortion occurs. Therefore, the applicant of the present application has further proposed a high-efficient coding apparatus in which when the bit length Nb is determined, the maximum distortion is not fixed but changed relative to the dynamic range by nonlinear characteristic which matches with human visual characteristic to thereby make the bit length Nb smaller to thereby make it possible to heighten the compressibility without generating deterioration in the restoration image, such as block distortion (See Japanese Patent Laid-Open Publication No. 62-266989).

In the high-efficient coding apparatus using the ADRC system under the consideration of a recording system of a VTR, compression using a variable length code is not performed. As known well, the compression using the variable length coding such as run length limited coding is a method in which information compression is performed by using information indicating how long one data is continued. In the case where the variable length coding is carried out, original data cannot be restored when errors are generated. As described above, in the case where variable length code is used in the ADRC method under the consideration of a recording system of a VTR, original data cannot be restored when errors are generated. Accordingly, variable length coding with a high compressing efficiency cannot be employed, so that there arises a disadvantage that compressibility cannot be improved.

The present invention is under the consideration of the aforementioned point of view and has as its object the provision of an encoder and a decoder in which the variable length coding is employed to improve compressing efficiency and in which original data can be restored as sufficiently as possible even in the case where errors are generated.

DISCLOSURE OF THE INVENTION

According to a first aspect of the present invention, there is provided an encoder comprising: a first encoding means for encoding pixel information by a first method; a dividing means for dividing the pixel information encoded by the first encoding means into a plurality of bit planes; a second encoding means for encoding the data by a second method for every bit plane divided and generated by the dividing means; and an error correcting code addition means for adding an error correcting code to the image information encoded by the second encoding means.

According to a second aspect of the present invention, there is provided an encoder in which the first method used in the first encoding means calculates a dynamic range determined on the basis of the maximum and minimum values of a plurality of pixels contained in a two-dimensional block and performs encoding in a variable bit length suited to the dynamic range.

According to a third aspect of the present invention, there is provided an encoder in which the second method used in the second encoding means performs encoding for a continuous length of pixel information.

According to a fourth aspect of the present invention, there is provided an encoder in which the second method used in the second encoding means performs encoding by using statistical characteristic of pixel information.

According to a fifth aspect of the present invention, there is provided an encoder in which the generation of the above bit planes is carried out at every block constituted by a predetermined number of pixels.

According to a sixth aspect of the present invention, there is provided an encoder in which the generation of the above bit planes is carried out at every screen unit.

According to a seventh aspect of the present invention, there is provided an encoder in which bit shifting is performed at the time of the generating of the above bit planes.

According to an eighth aspect of the present invention, there is provided an encoder in which the plurality of above bit planes are composed of at least a plane constituted by a MSBs, a plane constituted by an n-th MSB and a plane constituted by a LSBs.

According to a ninth aspect of the present invention, there is provided an encoder in which processing is made while the plane constituted by the MSBs in the plurality of above bit planes is arranged at the head.

According to a tenth aspect of the present invention, there is provided an encoder in which the MSB in the plane constituted by the above MSBs is arranged on the basis of a predetermined rule in terms of time or in terms of space.

According to an eleventh aspect of the present invention, there is provided an encoder in which the second encoding means performs encoding such that data in the plane constituted by the above MSB are made all "0" when there is no plane constituted by the above MSBs.

According to a twelfth aspect of the present invention, there is provided an encoder in which at least information indicating the fact that the number of allocation bits for quantization is "0" is outputted instead of the plane constituted by the above MSB when there is no plane constituted by the above MSBs.

According to a thirteenth aspect of the present invention, there is provided an encoder in which the second encoding means performs encoding at least on the basis of the information sequence of the plane constituted by the above MSB and the plane constituted by the above LSBs.

According to a fourteenth aspect of the present invention, there is provided a decoder comprising: an error correcting means for performing error correction on the basis of an error correcting code added to input pixel information; a first decoding means for decoding the output of the error correcting means by a first method; a conversion means for converting pixel information of a plurality of bit planes decoded by the first decoding means into original information; and a second decoding means for decoding the output of the conversion means by a second method to thereby obtain original image information.

According to a fifteenth aspect of the present invention, there is provided a decoder in which the first method used in the first decoding means decodes information encoded for a continuous length of pixel information.

According to a sixteenth aspect of the present invention, there is provided a decoder in which the second method used in the second decoding means calculates a dynamic range determined on the basis of the maximum and minimum values of a plurality of pixels contained in the two-dimensional block and decodes information encoded in a variable bit length suited to the dynamic range.

According to a seventeenth aspect of the present invention, there is provided a decoder in which the first method used in the first decoding means decodes information encoded by using the statistical characteristic of pixel information.

According to an eighteenth aspect of the present invention, there is provided a decoder in which the plurality of bit planes obtained by decoding through the first decoding means are formed by bit shifting.

According to a nineteenth aspect of the present invention, there is provided a decoder in which the plurality of bit planes obtained by decoding through the first decoding means are generated at every block constituted by a predetermined number of pixels.

According to a twentieth aspect of the present invention, there is provided a decoder in which the plurality of bit planes obtained by decoding through the first decoding means are generated at screen unit.

According to a 21st aspect of the present invention, there is provided a decoder in which the plurality of bit planes obtained by decoding through the first decoding means are composed of at least a plane constituted by the MSBs, a plane constituted by the n-th MSBs and a plane constituted by the LSBs.

According to a 22nd aspect of the present invention, there is provided a decoder in which encoded information corresponding to the plane constituted by the MSB is decoded first in one and the same block or in one and the same screen by the first decoding means.

According to a 23rd aspect of the present invention, there is provided a decoder in which the MSB in the plane constituted by the MSB in the plurality of planes decoded by the first decoding means is arranged on the basis of a predetermined rule in terms of time or in terms of space.

According to a 24th aspect of the present invention, there is provided a decoder in which at least the fact that the number of allocation bits for quantization is "O" is recognized in the decoder side when data in the plane constituted by the MSB obtained by decoding through the first decoding means are all "0".

According to a 25th aspect of the present invention, there is provided a decoder in which at least information indicating the fact that the number of allocation bits for quantization is "0" is given and recognized when there is no information corresponding to the plane constituted by the MSB to be decoded by the first decoding means.

According to a 26th aspect of the present invention, there is provided a decoder in which the second decoding means performs decoding on the basis of the information sequence of at least the plane constituted by the MSB and the plane constituted by the LSB among the plurality of planes obtained by decoding through the first decoding means.

BEST MODE FOR CARRYING OUT THE INVENTION

Figure 1A:
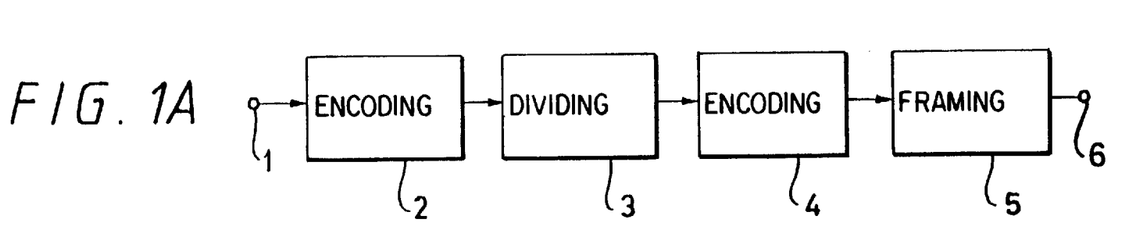
FIG. 1A is a diagram showing an embodiment of an encoder according to the present invention.

FIG. 1A shows an encoder. In FIG. 1 the reference numeral 1 designates an input terminal supplied with image data (digital television signal) which are, for example, given from a recording system of a not-shown VTR and, for example, quantized so that one sample forms eight bits. The image data from the input terminal 1 are supplied to an encoding circuit 2. For example, the encoding circuit (ADRC: adaptive dynamic range coding circuit) 2 divides the image data supplied through the input terminal 1 into two-dimensional blocks of a predetermined unit, calculates a dynamic range determined on the basis of the maximum and minimum values of a plurality of pixels contained in the divided two-dimensional blocks and performs encoding with a variable bit length suited to the dynamic range. The thus encoded image data (hereinafter referred to as "block data") are supplied to a dividing circuit 3.

Figure 5:
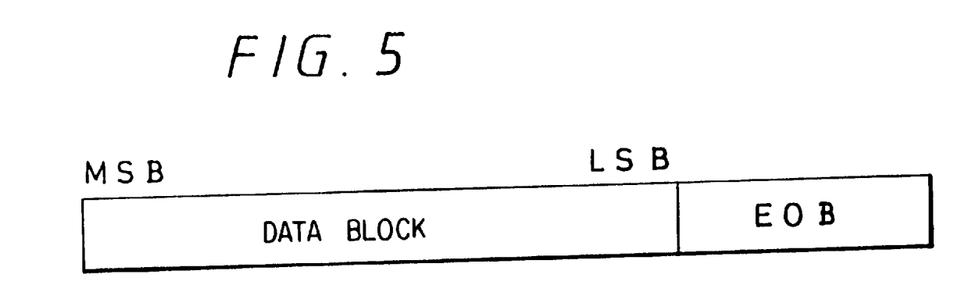
FIG. 5 is an explanatory view for explaining an embodiment of an encoder and a decoder according to the present invention.

FIG. 5 shows an example of the block data generated by the encoding. As shown in FIG. 5, one block data is, for example, composed of a data block and a code block called "end-of-block (EOB)" indicating the end of one block. The data block is composed of MSB, 2nd SB, . . . , and LSB. When such a block data is supplied to the dividing circuit 3, the dividing circuit 3 divides the block data into bit planes. As described above with reference to FIG. 5, the bit planes used herein mean bit planes for the MSB, 2nd SB, . . . , and LSB constituting one data block. That is, the division into the bit planes means the division into units for carrying out the following procedures by using the MSB, 2nd SB, . . . , and LSB respectively.

Referring to FIG. 4, the method for dividing an image data encoded by the ADRC method into bit planes will be described further. FIG. 4A shows image data (block data), for example, processed by the ADRC method. For example, the numerical values shown in FIG. 4A represent levels of the image data. When the block data shown in FIG. 4A is expressed by the three bits of MSB, 2nd MSB and LSB as shown in FIG. 4B, since the MSB is the most significant bit, it takes "1" in the case of a decimal number of "7", "6", "5" or "4" and takes "0" in the case of a decimal number of "3", "2", "1", or "0"; since the 2nd MSB is the second significant bit, it takes "1" in the case of decimal numbers of "7", "6", and "3", "2" and takes "0" in the case of a decimal number of "5", "4" and "1", "0"; and since the LSB is the least significant bit, it takes "1" in the case of a decimal number of "7", "5", "3" or "1" and takes "0" in the case of a decimal number of "6", "4", "2" or "0".

Figure 4A:
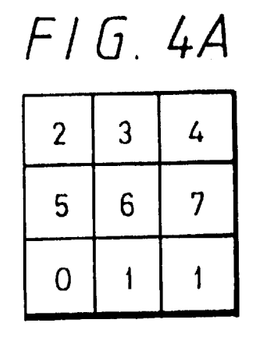
FIG. 4A is an explanatory view showing an example of block data used for explaining an embodiment of an encoder and decoder according to the present invention.
Figure 4B:
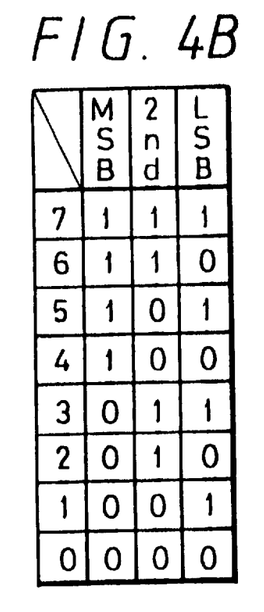
FIG. 4B is an explanatory view showing an example of the case where the block data shown in FIG. 4A is indicated by three bits, for explaining an embodiment of an encoder and a decoder according to the present invention.
Figure 4C:
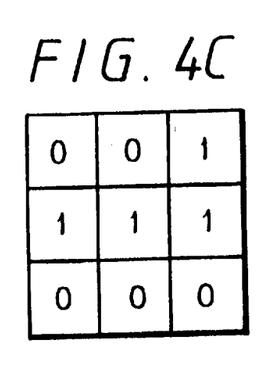
FIG. 4C is an explanatory view showing an example of the case where the MSBs shown in FIG. 4B are allocated to a bit plane, for explaining an embodiment of an encoder and a decoder according to the present invention.
Figure 4D:
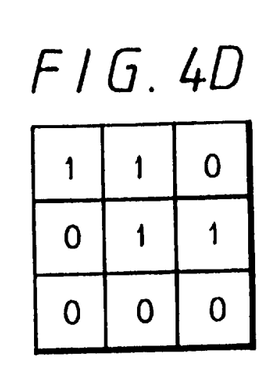
FIG. 4D is an explanatory view showing an example of the case where the 2nd MSBs shown in FIG. 4B are allocated to a bit plane, for explaining an embodiment of an encoder and a decoder according to the present invention.
Figure 4E:
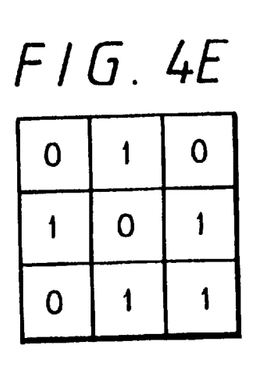
FIG. 4E is an explanatory view showing an example of the case where the LSBs shown in FIG. 4B are allocated to a bit plane, for explaining an embodiment of an encoder and a decoder according to the present invention.

Accordingly, when the block data is divided into bit planes in accordance with the levels as shown in FIG. 4A, the MSB takes "1" in the portions corresponding to "4", "5", "6" and "7" in FIG. 4A and takes "0" in the other portions, that is, the values as shown in FIG. 4C are obtained. Next, the 2nd MSB takes "1" in the portions corresponding to "7", "6", "3" and "2" in FIG. 4A and takes "0" in the other portions, that is, the values as shown in FIG. 4D are obtained. Next, the LSB takes "1" in the portions corresponding to "1", "3", "5" and "7" in FIG. 4A and takes "0" in the other portions, that is, values as shown in FIG. 4E are obtained. In this manner, the block data encoded by the ADRC method is divided into bit plane data.

The bit plane data divided by the diving circuit 3 are supplied to an encoding circuit 4. The encoding circuit 4 processes the bit plane data from the dividing circuit 3 with variable length coding such as run length coding, Huffman coding, or the like, and supplies the bit plane data processed with the variable length coding to a framing circuit 5. In this embodiment, run length coding is carried out before Huffman coding processing is carried out. This is because better coding efficiency can be obtained in the case where run length coding is carried out before Huffman coding processing.

The framing circuit 5 carries out an error correction coding process on the bit plane data from the encoding circuit 4, further adds a synchronizing signal thereto to obtain transmission data (or recording data) and supplies the data through an output terminal 6, for example, to a recording system of a not shown VTR. In this occasion, the MSB bit plane data processed with the variable length coding is arranged prior to the other, 2nd MSB and LSB bit plane data and at the same time the position of the MSB bit plane data is decided in advance so that recording is performed in a regular arrangement. In this manner, the influence of error propagation can be lowered. In the case of run length coding, because data after data in which an error has been generated cannot be used at all, the MSB bit plane which most directly determines general flows is arranged at the head to thereby minimize the influence by the error. Although the same work as described above can be carried out even in the case where the number of quantized bits allocated to every block is changed, there is no MSB plane in the case where the number of allocation bits is "0". Accordingly, in this case, data which are encoded so that the MSB plane data are all "0" may be transmitted or data in which the above plane data 'correspond to "0" bits' may be transmitted. Because there is a difference in data sequence between the bit plane in the vicinity of the MSB and the bit plane in the vicinity of the LSB, more efficient coding can be made when coding patterns are switched, for example, by changing coding tables. This is because, in Huffman coding and run length coding, the MSB bit plane data are used for understanding the general flows whereas the LSB bit plane data change delicately.

Accordingly, for example, only the MSB bit plane may be subjected to coding and the 2nd MSB and LSB bit planes are not subjected to coding. Alternatively, the MSB and 2nd MSB bit planes may be subjected to coding selectively and the LSB bit plane is not subjected to coding. Further, bit shifting may be carried out. By the aforementioned procedures, strength against errors can be provided. In a recording system of a VTR, the data from the framing circuit 5 are processed by various recording processes such as amplification, modulation, etc. and then recorded on a magnetic tape not shown to form slant tracks thereon.

Figure 2:
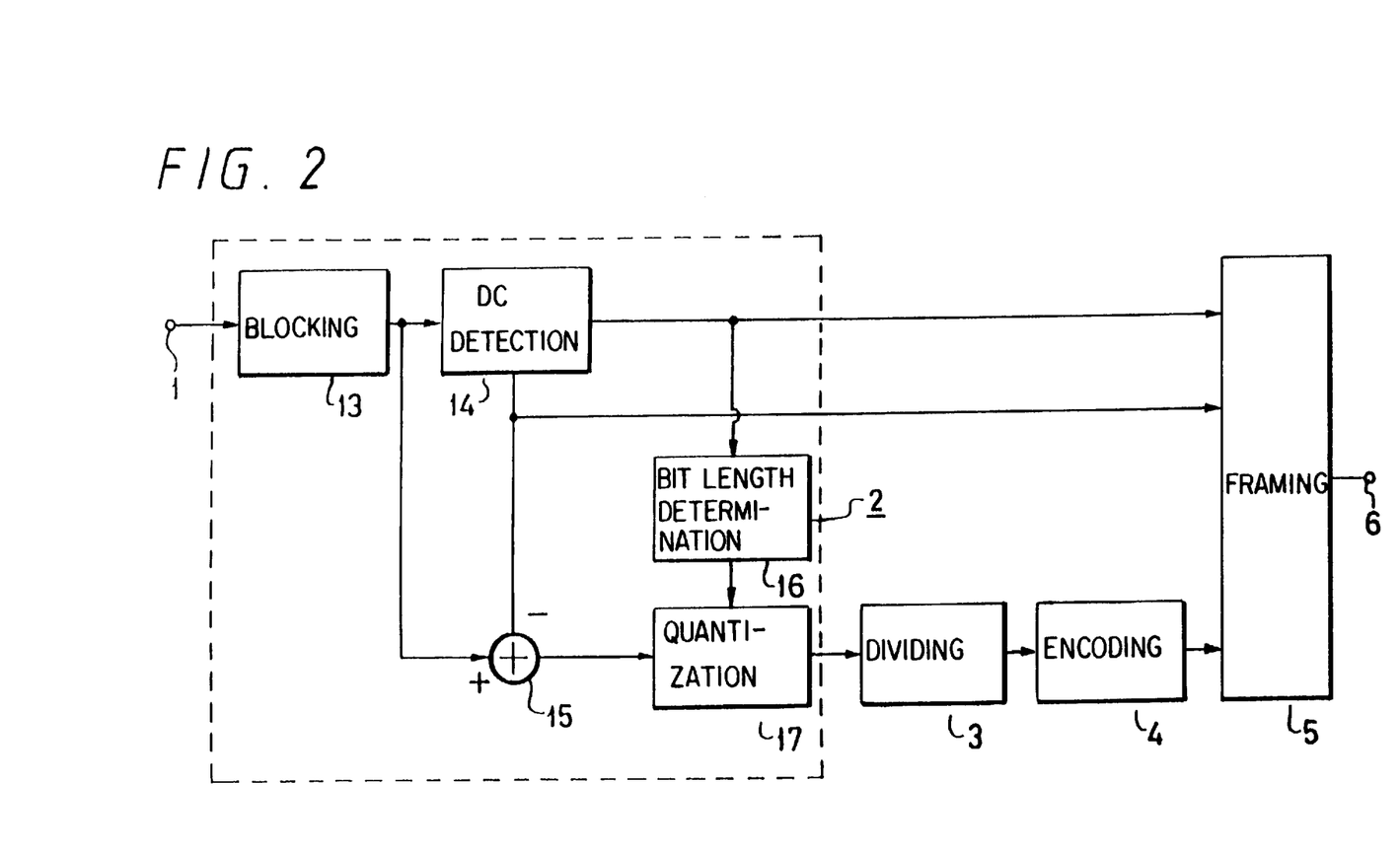
FIG. 2 is a diagram showing an important part of an embodiment of an encoder according to the present invention.

Referring next to FIG. 2, the encoder shown in FIG. 1A will be described more in detail. In FIG. 2, parts corresponding to those in FIG. 1A are marked with the same reference numerals and detailed description about them is omitted here. As shown in FIG. 2, image data which are for example, quantized so that one sample forms eight bits are supplied to the input terminal 1. The image data are then supplied to a blocking circuit 13. The reference numeral 13 designates a blocking circuit and this blocking circuit 13 converts the input image data into a continuous signal at every two-dimensional block which is a coding unit. In this embodiment, the size of one block is, for example, selected to be (4 lines×4 pixels=16 pixels). The image data (pixel data) processed by the blocking circuit 13 are supplied to a dynamic range (DR) detection circuit 14 and to an addition circuit 15. The dynamic range detection circuit 14 detects the dynamic range and the minimum value of the pixel data from the blocking circuit 13 at every block and the minimum value data are supplied to the addition circuit 15 and to the framing circuit 5 and at the same time the dynamic range data are supplied to a bit length determination circuit 16 and to the framing circuit 5.

The addition circuit 15 subtracts the minimum value data of the dynamic range detection circuit 14 from the image data of the blocking circuit 13 and supplies the result of subtraction to a quantizing circuit 17. On the other hand, the bit length determination circuit 16 determines the number of quantized bits (bit length) in accordance with the dynamic range. In this case, the bit length is determined under the consideration of human visual characteristic. That is, in the case of a wide dynamic range, the maximum distortion is selected to be large. As an example, the bit length determination circuit 16 determines the bit length in accordance with the dynamic range as follows. That is, in the case where a dynamic range of from 0 to 10 inclusive is given, the bit length and the maximum distortion are selected to be "0" and "5" respectively. In the case where a dynamic range of from 11 to 25 inclusive is given, the bit length and the maximum distortion are selected to be "1" and "6" respectively. In the case where a dynamic range of from 26 to 99 inclusive is given, the bit length and the maximum distortion are selected to be "2" and "12" respectively. In the case where a dynamic range of from 100 to 255 inclusive is given, the bit length and the maximum distortion are selected to be "3" and "16" respectively.

The bit length data thus determined are supplied to the quantizing circuit 17. The quantizing circuit 17 carries out a quantizing process onto the result of addition by the addition circuit 15, that is, onto the pixel data after removal of the maximum value on the basis of the bit length data obtained by the bit length determination circuit 16 and supplies the data obtained by the quantizing process, that is, encoded codes, to the dividing circuit 3. As explained above with reference to FIG. 1, the dividing circuit 3 divides the encoded codes, that is, the block data, into bit planes and supplies the bit plane data obtained by the division to the encoding circuit 4. As explained above with reference to FIG. 1, the encoding circuit 4 processes the bit plane data from the dividing circuit 3 by variable length coding and the like and supplies the processed data to the framing circuit 5. The framing circuit 5 applies error correction coding to the dynamic range (for example, 8 bits) and minimum data (for example, 8 bits 9) from the dynamic range detection circuit 14 and the block data (encoded codes) from the encoding circuit 4 respectively and also adds a synchronizing signal thereto to obtain recording data or transmission data which are supplied through the output terminal 6 to a recording system of a VTR and the like.

Figure 1B:
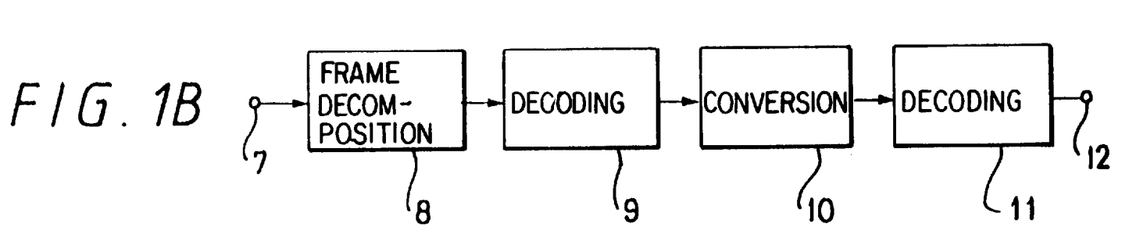
FIG. 1B is a diagram showing an embodiment of an encoder according to the present invention.

Referring next to FIG. 1B, a decoder in a recording system (a reception system in data transmission or the like) of a VTR will be explained. In FIG. 1B, the reference numeral 7 designates an input terminal which is supplied with reproduction data reproduced by a reproducing system of a not shown VTR or the like. The reproduction data are supplied to a frame decomposition circuit 8 through the input terminal 7. The frame decomposition circuit 8 decomposes the reproduction data supplied through the input terminal 7 into dynamic range and minimum value data and block data (encoded codes) and at the same time carries out an error correcting process onto these data. Then, the data subjected to the error correcting process are supplied to a decoding circuit 9. The decoding circuit 9 decodes the block data from the frame decomposition circuit 8 to obtain bit plane data and supplies the bit plane data to a conversion circuit 10. The conversion circuit 10 carries out a process reverse to the process shown in FIG. 4 onto the bit plane data supplied from the decoding circuit 9 to thereby obtain original block data and supplies the original block data to a decoding circuit 11. The decoding circuit 11 obtains image data (a digital television signal) which are quantized so that one sample forms eight bits, on the basis of the block data, dynamic range and minimum data from the conversion circuit 10 and supplies the image data through an output terminal 12, for example, to a reproducing system of a not shown VTR.

Figure 3:
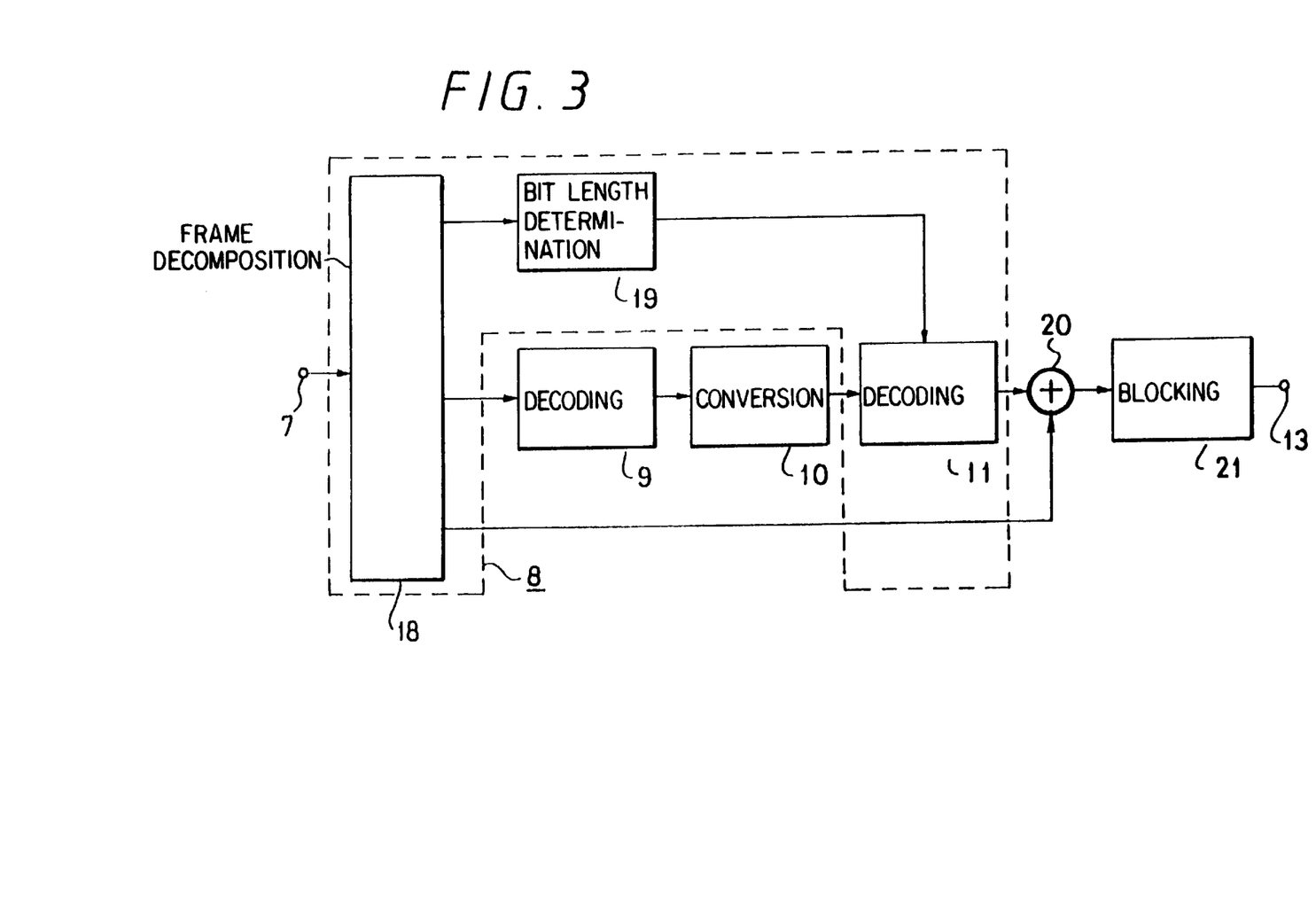
FIG. 3 is a diagram showing an important part of an embodiment of a decoder according to the present invention.

Referring next to FIG. 3, the decoder shown in FIG. 1B will be explained more in detail. In FIG. 3, parts corresponding to those in FIG. 1B are marked with the same reference numerals and the detailed description of them is omitted here. In FIG. 3, a frame decomposition circuit 18 in the frame decomposition circuit 8 separates the reproduction data supplied through the input terminal 7 from a reproducing system of a not shown VTR, into block data (encoded codes), minimum value data and dynamic range data at every bit plane and at the same time carries out an error correcting process onto these data. Thereafter, the block data, the dynamic range data and the minimum value data are supplied to an decoding circuit 9, a bit length determination circuit 19 and an addition circuit 20 respectively. The bit length determination circuit 19 determines the bit length at every block from the dynamic range in the same manner as in the encoder and supplies the bit length data to a decoding circuit 11. The decoding circuit 9 decodes the block data supplied at every bit plane from the frame decomposition circuit 18 to thereby obtain original bit plane data and supplies the bit plane data to a conversion circuit 10. The conversion circuit 10 carries out a process reverse to the process shown in FIG. 4 onto the bit plane data supplied from the decoding circuit 9 to thereby obtain original block data and supplies the block data to the decoding circuit 11. The decoding circuit 11 carries out a process reverse to the process in the quantizing circuit 17 of the encoder. That is, data after removal of the minimum level of 8 bits are decoded into representative level data which are then supplied to the addition circuit 20. The addition circuit 20 adds the data of the decoding circuit 11 and the minimum value data of the frame decomposition circuit 18 to each other to thereby decode original pixel data. The output of the addition circuit 20 is supplied to a block decomposition circuit 21. The block decomposition circuit 21 converts the decoded data of a block sequence into data of the same sequence as the scanning sequence of television signal by a process reverse to the process in the blocking circuit 13 of the encoder, and supplies the data thus obtained by the conversion to a reproducing system of a not shown VTR through an output terminal 13.

As described above, in this embodiment, data encoded by the ADRC method are divided into bit planes at every MSB, 2nd MSB, ..., and LSB, and the data for every bit plane are subjected to run length coding and Huffman coding. Accordingly, it is possible to compress the data with a high compressibility, and, at the same time, it is possible to minimize the degradation of the restoration capability of the data when an error is generated.

Further, at the time of data transmission or data recording, data are transmitted or recorded regularly while block data obtained by encoding bit plane data for MSB is arranged at the head. Accordingly, resistivity against errors can be provided.

Further, patterns of the Huffman coding processing for bit plane data of the MSB and the bit plane data of the LSB are changed, for example, by switching coding tables or the like. Accordingly it is possible to perform coding with a high efficiency.

When, for example, the aforementioned encoder and decoder are applied to an HD (high definition) VTR, it is possible to record image data with a high efficiency and restore (reproduce) recorded data with a high restoration capability.

Although the aforementioned embodiment has shown the case where variable length coding at every block is employed, the invention can be applied to the case where variable length coding at every bit plane is used in the whole screen.

Although the aforementioned embodiment has shown the case where an encoder and a decoder are mounted on a VTR, the same effect as in the embodiment can be achieved when they are applied to a data transmission system such as a television or video conference system.

As described above, in this embodiment, there are provided the encoding circuit 2 which encodes image data by the ADRC method; the dividing circuit 3 which divides block data encoded by the encoding circuit 2 into a plurality of bit planes; the encoding circuit 4 which encodes the data at every bit plane by variable length coding such as run length coding, Huffman coding, and so on; and the framing circuit 5 which adds error correcting codes to the encoded image data. Accordingly, it is possible to achieve a high compressibility, and, at the same time, it is possible to minimize the degradation of the restoration capability of the data when errors are generated.

Further, in this embodiment, the encoding circuit 2 may calculate a dynamic range determined on the basis of the maximum and minimum values of a plurality of pixels contained in a two-dimensional block and may perform encoding in a variable bit length suited to the dynamic range. Accordingly, compressing efficiency can be improved in addition to the aforementioned effect.

Further, in this embodiment, the encoding circuit 4 may perform encoding for a continuous length of pixel information. Accordingly, compressing efficiency can be further improved in addition to the aforementioned effect.

Further, in this embodiment, the encoding circuit 4 may perform encoding by using of statistical characteristic of pixel information. Accordingly, error propagation is not likely performed in addition to the aforementioned effect.

Further, in this embodiment, bit planes may be generated at every block constituted by a predetermined number of pixels. Accordingly, compressing efficiency and compressing accuracy can be improved in addition to the aforementioned effect.

Further, in this embodiment, bit planes may be generated at the screen unit. Accordingly, compressibility can be improved in addition to the aforementioned effect.

Further, in this embodiment, bit shifting may be performed at the time of generating of bit planes. Accordingly, the degradation of the restoration capability of the data can be suppressed when errors are generated.

Further, in this embodiment, the plurality of bit planes may be constituted by at least planes for MSB, n-th MSB and LSB. Accordingly, in addition to the aforementioned effect, it is possible to improve compressing efficiency and at the same time prevent error propagation.

Further, in this embodiment, processing may be made while the plane for MSB in the plurality of bit planes is arranged at the head. Accordingly, the influence by error propagation can be reduced in addition to the aforementioned effect.

Further, in this embodiment, MSBs in the MSB plane may be arranged on the basis of a predetermined rule in terms of time or in terms of space. Accordingly, the influence by error propagation can be reduced in addition to the aforementioned effect.

Further, in this embodiment, the encoding circuit 4 may encode the data so that data in the MSB plane are all "0" when there is no MSB plane. Accordingly, in addition to the aforementioned effect, it is possible to improve compressing efficiency and simplify the process.

Further, in this embodiment, at least information indicating the fact that the number of allocation bits for quantization is "0" may be outputted instead of the MSB plane when there is no MSB plane. Accordingly, in addition to the aforementioned effect, it is possible to improve compressing efficiency and simplify the process.

Further, in this embodiment, the encoding circuit 4 may encode the data on the basis of the information sequence of at least planes for MSB and LSB. Accordingly, resistivity against errors can be provided in addition to the aforementioned effect.

In this embodiment, error correcting is performed by the frame decomposition circuit 8 on the basis of error correcting codes added to the input pixel data; the output of the frame decomposition circuit is decoded by a decoding circuit 9 with run length coding and Huffman coding; a plurality of decoded bit plane data are converted into block data by the conversion circuit 10; and the output of the conversion circuit is decoded by the decoding circuit 11 by the ADRC method so that original image data are obtained. Accordingly, it is possible to restore the encoded data satisfactorily.

Further, in this embodiment, the decoding circuit 9 may decode information encoded for a continuous length of pixel information. Accordingly, data can be restored satisfactorily in addition to the aforementioned effect.

Further, in this embodiment, the decoding circuit 11 may calculate a dynamic range determined on the basis of the maximum and minimum values of a plurality of pixels contained in the two-dimensional block and may decode information encoded in a variable bit length suited to the dynamic range. Accordingly, data can be restored satisfactorily in addition to the aforementioned effect.

Further, in this embodiment, the decoding circuit 9 may decode information encoded by using statistical characteristic of pixel information. Accordingly, in addition to the aforementioned effect, data can be restored satisfactorily even when errors are generated.

Further, in this embodiment, the plurality of bit planes obtained by decoding in the decoding circuit 9 may be subjected to bit shifting. Accordingly, in addition to the aforementioned effect, data can be restored satisfactorily even when errors are generated.

Further, in this embodiment, the plurality of bit planes obtained by decoding in the decoding circuit 9 may be generated at every block constituted by a predetermined number of pixels. Accordingly, in addition to the aforementioned effect, data can be restored satisfactorily even when errors are generated.

Further, in this embodiment, the plurality of bit planes obtained by decoding in the decoding circuit 9 may be generated at the screen unit. Accordingly, in addition to the aforementioned effect, data can be restored satisfactorily even when errors are generated.

Further, in this embodiment, the plurality of bit planes obtained by decoding in the decoding circuit 9 may be constituted by at least planes for MSB, n-th MSB and LSB. Accordingly, in addition to the aforementioned effect, data can be restored satisfactorily even when errors are generated.

Further, in this embodiment, encoded information corresponding to the MSB plane may be decoded first in the same block or in the same screen by the first decoding circuit 9. Accordingly, in addition to the aforementioned effect, data can be restored satisfactorily even when errors are generated.

Further, in this embodiment, MSBs in the MSB plane in the plurality of planes decoded by the decoding circuit 9 may be arranged on the basis of a predetermined rule in terms of time or in terms of space. Accordingly, in addition to the aforementioned effect, data can be restored satisfactorily even when errors are generated.

Further, in this embodiment, at least the fact that the number of allocation bits for quantization is "0" may be recognized in the decoder side when data in the MSB plane obtained by decoding in the decoding circuit 9 are all "0". Accordingly, in addition to the aforementioned effect, the data restoring process can be simplified.

Further, in this embodiment, at least information indicating the fact that the number of allocation bits for quantization is "0" may be inputted and recognized when there is no information corresponding to the MSB plane to be decoded by the decoding circuit 9. Accordingly, in addition to the aforementioned effect, the data restoring process can be simplified.

Further, in this embodiment, the decoding circuit 11 may decode the data on the basis of the information sequence of at least planes for MSB and LSB among the plurality of planes obtained by decoding in the decoding circuit 9. Accordingly, in addition to the aforementioned effect, data can be restored satisfactorily even when errors are generated.

We claim:

1. An apparatus for encoding image data in the form of bit plane data so as to provide compressed image data, comprising:

means for encoding pixel information contained in a supplied image data to form two dimensional blocks of a predetermined unit;

means for dividing said encoded pixel information contained in said two dimensional blocks into a plurality of bit planes to provide a plurality of bit plane data, said plurality of bit planes being composed of at least a plane constituted by most significant bits (MSBs), a plane constituted by n-th significant bits and a plane constituted by least significant bits (LSBs), where n is an integer between least and most;

means for compressing said plurality of bit plane data for a continuous length to provide compressed bit plane data, wherein said means for compressing determines a first coding and compression scheme for said plurality of bit plane data constituted by MSBs in accordance with the information sequence thereof and compresses at least said plurality of bit plane data constituted by MSBs in accordance with said first coding and compression scheme, and wherein said means for compressing said plurality of bit plane data determines a second coding and compression scheme independent from the determination of said first coding and compression scheme for said plurality of bit plane data constituted by LSBs in accordance with the information sequence thereof and compresses at least said plurality of bit plane data constituted by LSBs independently from the compression of said bit plane data constituted by MSBs in accordance with said second coding and compression scheme, and wherein said plane constituted by MSBs is arranged at the head of said plurality of bit plane data; and means for adding an error correcting code and synchronizing signal to said compressed bit plane data to provide compressed image data.

2. The apparatus of claim 1, wherein said means for encoding is operable to calculate a dynamic range determined as a function of maximum and minimum values of a plurality of pixels contained in a two-dimensional block and encode said pixel information with a variable bit length determined as a function of said dynamic range.

3. The apparatus of claim 1, wherein said means for compressing is operable to compress said plurality of bit plane data with all data in said plane constituted by MSBs equal to "0" when there is no plane constituted by MSBs.

4. The apparatus of claim 1, wherein said means for dividing is operable to generate allocation information equal to "0" indicating that no bits have been allocated for quantization instead of said plane constituted by MSBs when there is no plane constituted by MSBs.

5. An apparatus for encoding image data in the form of bit plane data so as to provide compressed image data, comprising:.

means for encoding pixel information contained in a supplied image data to form two dimensional blocks of a predetermined unit;

means for dividing said encoded pixel information contained in said two dimensional blocks into a plurality of bit planes to provide a plurality of bit plane data, said plurality of bit planes being composed of at least a plane constituted by most significant bits (MSBs), a plane constituted by n-th significant bits and a plane constituted by least significant bits (LSBs), where n is an integer between least and most;

means for compressing said plurality of bit plane data for a continuous length to provide compressed bit plane data, wherein said means for compressing determines a first coding and compression scheme for said plurality of bit plane data constituted by MSBs in accordance with the information sequence thereof and compresses at least said plurality of bit plane data constituted by MSBs in accordance with said first coding and compression scheme, and wherein said means for compressing said plurality of bit plane data determines a second coding and compression scheme independently from the determination of said first coding and compression scheme for said plurality of bit plane data constituted by LSBs in accordance with the information sequence thereof and compresses at least said plurality of bit plane data constituted by LSBs independently from the compression of said bit plane data constituted by MSBs in accordance with said second coding and compression scheme, and wherein MSBs in said plane constituted by MSBs are arranged in terms of time or space in accordance with a predetermined rule; and means for adding an error correcting code and synchronizing signal to said compressed bit plane data to provide compressed image data.

6. The apparatus of claim 5, wherein said means for encoding is operable to calculate a dynamic range determined as a function of maximum and minimum values of a plurality of pixels contained in a two-dimensional block and encode said pixel information with a variable bit length determined as a function of said dynamic range.

7. The apparatus of claim 5, wherein said means for compressing is operable to compress said plurality of bit plane data with all data in said plane constituted by MSBs equal to "0" when there is no plane constituted by MSBs.

8. The apparatus of claim 5, wherein said means for dividing is operable to generate allocation information equal to "0" indicating that no bits have been allocated for quantization instead of said plane constituted by MSBs when there is no plane constituted by MSBs.

9. An apparatus for decoding image data encoded in the form of bit plane data, comprising:

means for separating supplied image data at least into an error correcting code and pixel information in each bit plane at a plurality of bit planes, wherein said plurality of bit planes are composed of at least a plane constituted by a plurality of bit plane data comprising most significant bits (MSBs), a plane constituted by a plurality of bit plane data comprising n-th significant bits and a plane constituted by a plurality of bit plane data comprising least significant bits (LSBs), where n is an integer between least and most, and performing error correction on said pixel information in response to said error correcting code;

means for decompressing said pixel information for a continuous length at each of said plurality of bit planes to provide decompressed pixel information, said pixel information corresponding to said plane constituted by MSBs being decompressed first;

means for forming said decompressed pixel information at a plurality of bit planes into two dimensional blocks of a predetermined unit containing said decompressed pixel information; and means for decoding said decompressed pixel information contained in said two dimensional blocks to obtain original image information, wherein said means for decoding decodes at least said plurality of bit plane data constituted by MSBs in accordance with a first coding and compression scheme for said plurality of bit plane data constituted by MSBs in accordance with the information sequence thereof, and wherein said means for decoding decodes independently from the decoding of said bit plane data constituted by MSBs at least said plurality of bit plane data constituted by LSBs in accordance with a second coding and compression scheme determined independently from the determination of said first coding and compression scheme for said plurality of bit plane data constituted by LSBs in accordance with the information sequence thereof.

10. The apparatus of claim 9, wherein said means for decoding is operable to calculate a dynamic range determined as a function of maximum and minimum values of a plurality of pixels contained in a two-dimensional block and decode said pixel information previously encoded with a variable bit length determined as a function of said dynamic range.

11. The apparatus of claim 9, wherein said means for decompressing is operable to recognize that no bits have been allocated for quantization when said decompressed pixel information from said plane constituted by MSBs are all "0".

12. The apparatus of claim 9, wherein said means for decompressing is operable to recognize that no bits have been allocated for quantization when there is no decompressed pixel information corresponding to said plane constituted by MSBs.

13. An apparatus for decoding image data encoded in the form of bit plane data, comprising:

means for separating supplied image data at least into an error correcting code and pixel information in each bit plane at a plurality of bit planes, wherein said plurality of bit planes are composed of at least a plane constituted by a plurality of bit plane data comprising most significant bits (MSBs), a plane constituted by a plurality of bit plane data comprising n-th significant bits and a plane constituted by a plurality of bit plane data comprising least significant bits (LSBs), where n is an integer between least and most, and performing error correction on said pixel information in response to said error correcting code;

means for decompressing said pixel information for a continuous length at each of said plurality of bit planes to provide decompressed pixel information;

means for forming said decompressed pixel information at a plurality of bit planes into two dimensional blocks of a predetermined unit containing said decompressed pixel information; and means for decoding said decompressed pixel information contained in said two dimensional blocks to obtain original image information, wherein said means for decoding decodes at least said plurality of bit plane data constituted by MSBs in accordance with a first coding and compression scheme for said plurality of bit plane data constituted by MSBs in accordance with the information sequence thereof, and wherein said means for decoding decodes independently from the decoding of said bit plane data constituted by MSBs at least said plurality of bit plane data constituted by LSBs in accordance with a second coding and compression scheme determined independently from the determination of said first coding and compression scheme for said plurality of bit plane data constituted by LSBs in accordance with the information sequence thereof, and wherein MSBs in said plane constituted by MSBs are arranged in terms of time or space in accordance with a predetermined rule.

14. The apparatus of claim 13, wherein said means for decoding is operable to calculate a dynamic range determined as a function of maximum and minimum values of a plurality of pixels contained in a two-dimensional block and decode said pixel information previously encoded with a variable bit length determined as a function of said dynamic range.

15. The apparatus of claim 13, wherein said means for decompressing is operable to recognize that no bits have been allocated for quantization when said decompressed pixel information from said plane constituted by MSBs are all "0".

16. The apparatus of claim 13, wherein said means for decompressing is operable to recognize that no bits have been allocated for quantization when there is no decompressed pixel information corresponding to said plane constituted by MSBs.

* * * * *